United States Patent [19]
Fernekes et al.

[11] Patent Number: 6,118,404
[45] Date of Patent: *Sep. 12, 2000

[54] METHOD AND SYSTEM FOR REPRESENTATION OF OVERLAPPING FEATURES IN GEOGRAPHIC DATABASES

[75] Inventors: Robert P. Fernekes, Wood Dale; Vijaya Israni, Hoffman Estates; Gregory M. Nyczak, Westmont; Robert Yates, Glen Ellyn, all of Ill.

[73] Assignee: Navigation Technologies Corporation, Rosemont, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/010,324

[22] Filed: Jan. 21, 1998

[51] Int. Cl.$^7$ ................ H04B 7/185; G01S 5/02

[52] U.S. Cl. ........... 342/357.13; 701/208; 340/990

[58] Field of Search ............... 701/208, 209, 701/210; 340/990, 995; 342/357.13

[56] References Cited

U.S. PATENT DOCUMENTS 5,285,391  2/1994  Smith, Jr. et al. ............ 340/995

*Primary Examiner*—Theodore M. Blum
*Attorney, Agent, or Firm*—Frank J. Kozak; Lawrence M. Kaplan

[57] ABSTRACT

A system and method for storing and using data representing crossings of geographic features, and an associated product having the data embodied thereon, for use with a computer based navigation system, is disclosed. A computer-readable medium has computer-readable data embodied thereon that represents geographic features in a geographic region. The computer-readable data includes a plurality of data entities of a first type each of which represents a respective one of a plurality of linearly extending geographic features and a plurality of data entities of a second type each of which represents a respective crossing at which one of the linearly extending geographic features represented by one of the plurality of data entities of the first type crosses over another of the linearly extending geographic features represented by another of the plurality of data entities of the first type at a higher altitude.

22 Claims, 8 Drawing Sheets

METHOD AND SYSTEM FOR REPRESENTATION OF OVERLAPPING FEATURES IN GEOGRAPHIC DATABASES

BACKGROUND OF THE INVENTION

The present invention relates to navigation systems and in particular to geographic data sets for use in navigation systems.

Computer-based navigation systems for use on land have become available in a variety of forms and provide for a variety of useful features. These features may include route calculation functions, maneuver generation functions, map display functions, vehicle positioning functions, destination resolution capabilities, and so on. When performing a map display function with a navigation system, the sizes, shapes, and relative positions of geographic features in a portion of a geographic region are portrayed on a display associated with the navigation system. These geographic features may include roads, intersections, and points-of-interest, as well as other features, such as lakes, railroad tracks, buildings, airports, stadiums, parks, mountain ranges, docks, ferries, tunnels, bridges, and so on. To provide this map display function, a geographic data set used with the navigation application program includes the appropriate information which allows the navigation system to display the size, shape, position, and character of these various geographic features on a display device associated with the navigation system. Zooming and panning of the displayed areas may also be supported.

When the navigation system provides the end user with a graphical visual display of a portion of the geographic region, it may provide an image that represents an overhead view (i.e., a two dimensional view or bird's eye view) similar to a conventional map. With an overhead view, roads or other geographic features that cross over or under each other should be portrayed in a manner that provides the end user with meaningful information. For example, it may be helpful to an end user to know that the road upon which he or she is driving is going to cross over an expressway, or cross under a railroad trestle, and so on. This kind of information provides visual cues which may be useful to assist the driver in relating his or her physical location to the image portrayed on the map display associated with the navigation system. In order to represent these overpass and underpass situations, the detailed geographic data set used by the navigation system may include relative elevational data ("z-levels") or altitude data associated with the data which represents the geographic features stored in the data set. Relative elevational data provides an ordering of all geographic features that cross at the same latitude and longitude coordinates. Altitude data may include the actual geographical altitude (e.g., feet above sea level) of a represented geographic feature.

Using the elevational data or the altitude data, the navigation system can determine which of the geographic features is topmost and portray this feature in a way that conveys to the end user that the topmost geographic feature passes over the other features. This determination may impose a computational burden on the navigation system thereby slowing down the speed at which the image is rendered. The determination of which geographic feature to show as being topmost may be further complicated when the navigation application supports zooming in and out. When an image is zoomed out, less detail may be included in the image thereby resulting in some topmost features, such as an overpass by a secondary roadway, being omitted from the zoomed out view. When this happens, it may be necessary to recalculate which feature is topmost. In addition, an image may include a feature that passes over another feature and then passes under a third feature. This further complicates the calculation of which feature is topmost since a feature may be topmost in one location but not topmost in another location. These considerations further complicate the process of displaying the image of the portion of the geographic region in a meaningful manner and impose a burden on the memory and processing resources of the navigation system.

Accordingly, there is a need in navigation systems to provide a method and system for representing geographic features which cross over or under each other in such a way as to minimize the impact on performance of the navigation system.

SUMMARY OF THE INVENTION

To achieve the foregoing and other objectives and in accordance with the purposes of the present invention, there is provided a system and method for storing and using data representing crossings of geographic features, and an associated product having the data embodied thereon, for use with a computer based navigation system. A computer-readable medium has computer-readable data embodied thereon that represents geographic features in a geographic region. The computer-readable data includes a first plurality of data entities of a first type each of which represents a respective one of a plurality of linearly extending geographic features and a second plurality of data entities of a second type each of which represents a respective crossing at which one of the linearly extending geographic features represented by one of the first plurality of data entities of the first type crosses over another of the linearly extending geographic features represented by another of the first plurality of data entities of the first type at a higher altitude.

DETAILED DESCRIPTION OF THE PRESENTLY PREFERRED EMBODIMENTS

A. Overview

Figure 1:
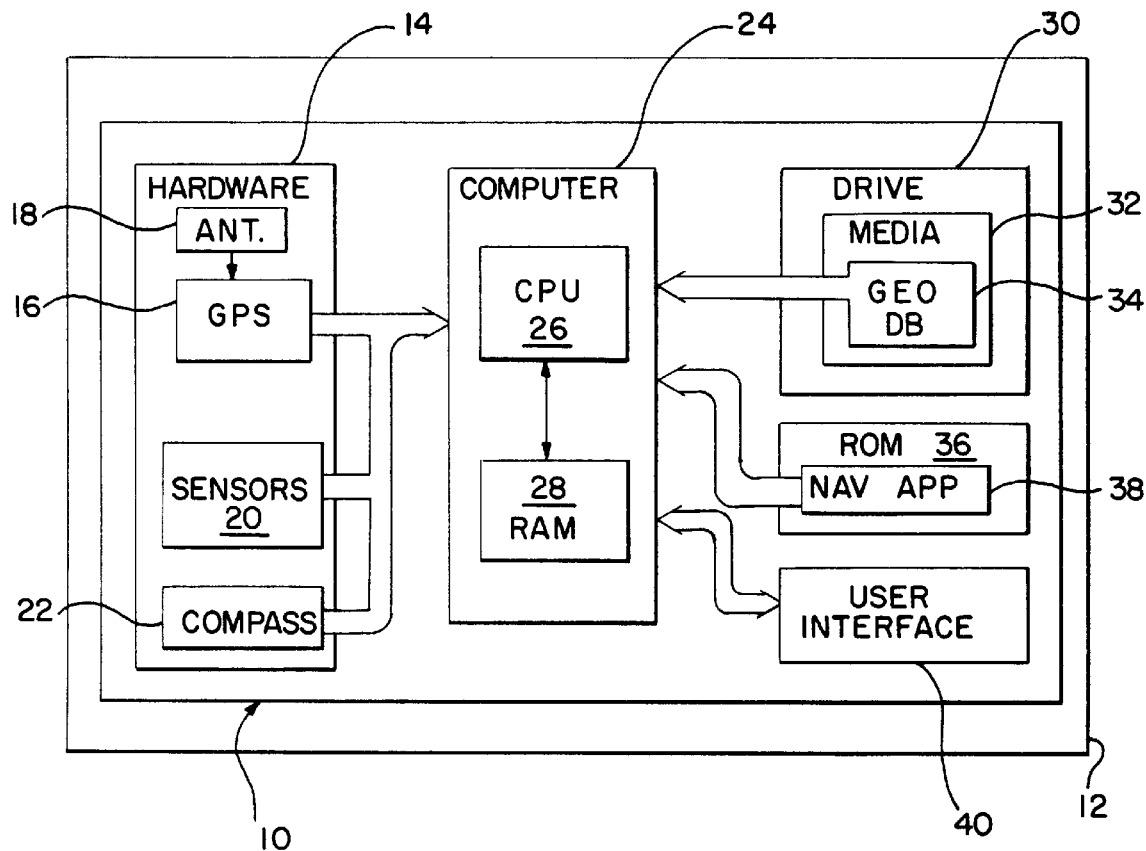
FIG. 1 is a block diagram illustrating a navigation system utilizing a first embodiment of the present invention.

Referring to FIG. 1, there is a diagram illustrating a configuration of an exemplary navigation system 10. The exemplary navigation system includes (1) one or more detailed data sets that represent one or more geographic areas or regions, (2) a navigation application program, (3) appropriate computer hardware, such as a microprocessor, memory, and data storage, and, optionally, (4) a positioning system. The navigation system 10 is a combination of hardware and software components which can be implemented in various different kinds of environments or on different platforms. For example, the navigation system 10 may be located in an automobile 12. In an exemplary embodiment, the navigation system 10 includes appropriate hardware 14 which may include a GPS system 16, an antenna 18, sensors 20 coupled to sense the vehicle speed and distance traveled, and a compass 22 to sense the vehicle direction. In addition, the navigation system includes an appropriate computer 24, including a CPU 26 and memory 28 as well as other appropriate hardware.

Included as part of the navigation system 10 is a drive 30 (or other suitable peripheral device) into which a data storage medium 32 can be installed. One or more geographic data sets 34 are stored on the storage medium 32. In one embodiment, the storage medium 32 is a CD-ROM disc. In another alternative embodiment, the storage medium 32 may be a PCMCIA card in which case the drive 30 would be substituted with a PCMCIA slot. Various other storage media may be used, including fixed or hard disks, DVD (digital video disks) or other currently available storage media, as well as storage media that may be developed in the future. The embodiments disclosed herein may be used in other types of navigation systems, as explained below.

The navigation system 10 also includes a user interface 40 coupled to the computer 24. The user interface 40 includes appropriate means for receiving instructions and input from an end-user as well as means for providing information back to the end-user. For example, the user interface 40 may include an input panel or keyboard into which an end-user may indicate a selection of a destination. The user interface 40 may also include a display or speakers (including speech synthesis hardware and software) by which the user can be informed of navigation information. For visual navigation information, the user interface 40 may provide features allowing the user to zoom a display in on or out of a particular geographic area to alternately display a larger geographic area or more detailed geographic information.

The positioning system may employ any of several well-known technologies to determine or approximate the end-user's physical locations in a geographic region. For example, the positioning system may employ a GPS-type system (global positioning system), a dead reckoning-type system, or combinations of these, or other systems, all of which are well-known in the art.

All of the components described above may be conventional (or other than conventional) and the manufacture and use of these components are known to those of skill in the art.

The navigation system 10 includes another data storage device 36 (or ROM) which is used to store a navigation application program 38. (Alternatively, the navigation application program 38 may be provided on the same storage device or medium 32 as the geographic data sets 34.) The navigation application program 38 is a software program that uses the geographic data set 34 and the positioning system (when employed). The navigation application program 38 may include separate applications (or subprograms). These subprograms provide various navigation features to the end-user of the navigation system 10. The navigation features are provided to the end-user (e.g., the vehicle driver) by means of the user interface 40. The navigation application program 38 may be written in a suitable computer programming language such as C, although other programming languages are also suitable.

During a typical usage of the navigation system 10 of FIG. 1, the navigation application program 38 is loaded from the ROM 36 into the memory 28 associated with the processor 26. The computer 24 receives input from the user interface 40. The input may include a request for navigation information. The computer 24 receives information from the positioning system hardware 14. The information from the hardware 14 is used by the navigation application software 38 to determine the location, direction, speed, etc., of the vehicle 12. The navigation application program 38 may provide the end-user with a graphical display (e.g. a "map") of the end-user's specific location in the geographic region. In addition, the navigation application program may provide the end-user with specific directions to locations in the geographic area from wherever the end-user is located.

To provide these various navigation application features, the navigation system 10 uses the geographic data 34 stored on the storage medium 32, optionally in conjunction with the output from the positioning system hardware 14. The geographic data 34 may be in the form of one or more computer-readable files or databases that enable the navigation application program 38 to provide the supported features. For example, to enable the calculation of a route between two locations in the geographic region, the geographic data 34 may include route calculation data that include the positions of roads and intersections in the geographic region, information about one-way streets, turn restrictions, stop signs, stop lights, speed limits, and so on.

Figure 2:
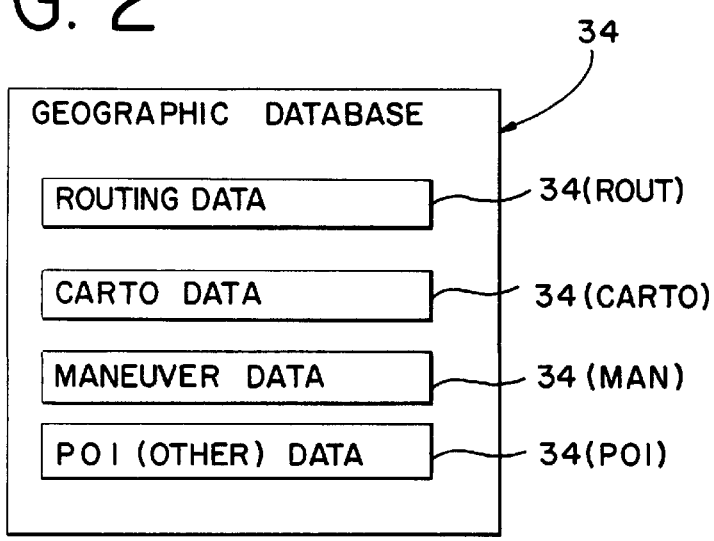
FIG. 2 is a block diagram illustrating the types of data in the geographic database shown in FIG. 1.

Referring to FIG. 2, there is a diagram illustrating a geographic database 34 containing the different types of data used by the navigation application program, including routing data 34(rout), cartographic data 34(carto), maneuver data 34(man) and POI (point-of-interest) data 34(poi). The routing data 34(rout) contains information that is used by the navigation application program to calculate routes between two locations within a geographic region represented by the geographic database 34. The cartographic data 34(carto) contains geographic feature information that is used by the navigation application program to display image representations (maps) of various portions of the geographic region represented by the geographic database 34 on a graphical display device associated with the navigation system. The maneuver data 34(man) contains information used by the navigation application program to generate navigation instructions for a given route between two locations within the geographic region represented by the geographic database 34. The POI data 34(poi) contains information associated with various points of interest located in the geographic region represented by the geographic database 34, such as museums, restaurants, hotels, airports, stadiums, and so on. Alternatively, the geographic database 34 may contain additional information to support other features of the navigation system.

Figure 3:
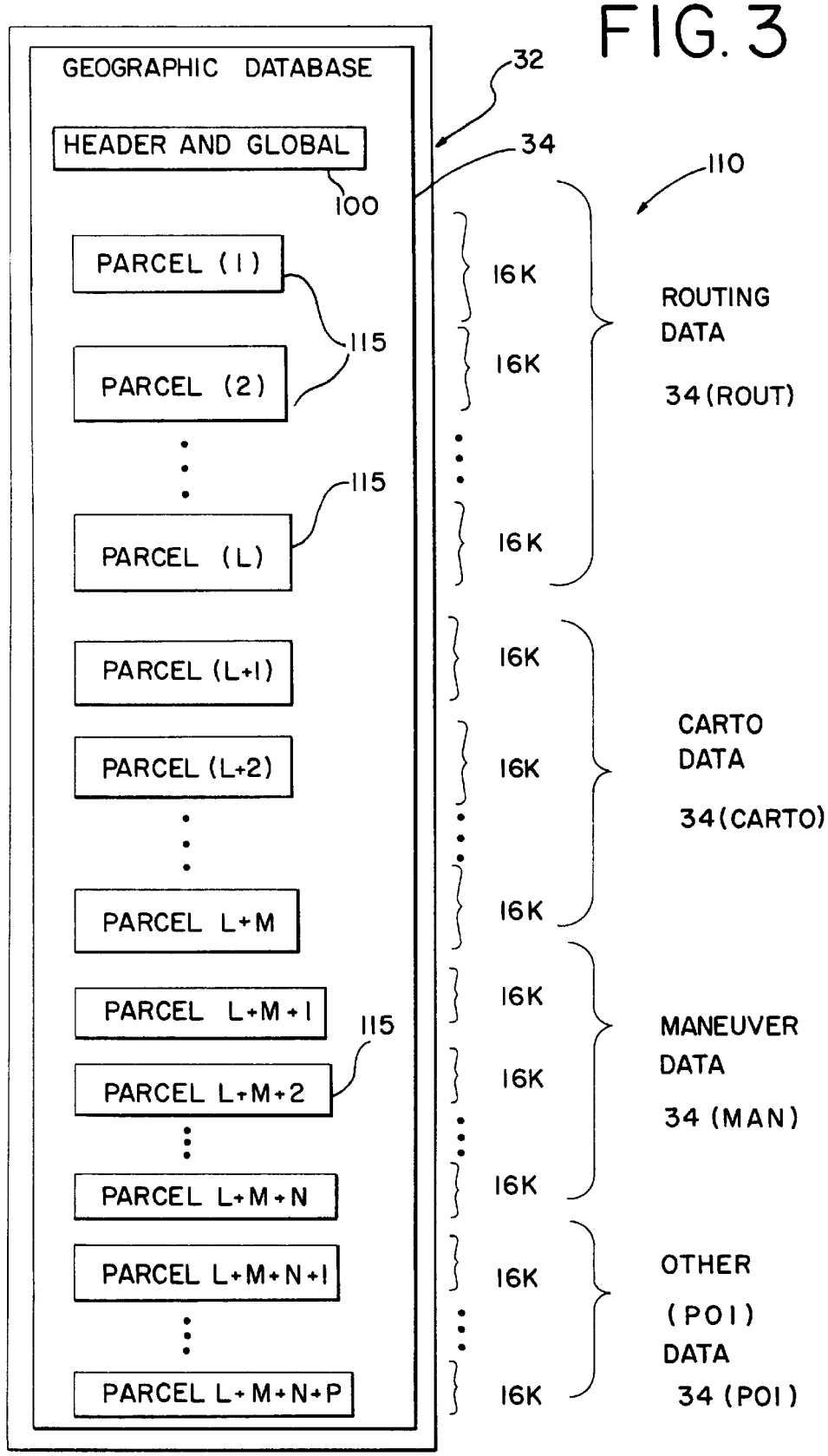
FIG. 3 is a block diagram illustrating the physical arrangement of the types of geographic data stored on the medium of FIG. 1.

FIG. 3 is a diagram illustrating the organization of the geographic database 34 embodied on the data storage medium 32. The geographic database 34 on the medium 32 includes header and global data 100 and geographic data 110. The header and global data 100 include information pertaining to the entire geographic database 34, such as an identification of the region represented by the database, the release date of the database, and so on. The geographic data 110 includes the data relating to the geographic features. Specifically, the geographic data 110 includes all the data which correspond to the different types of geographic data represented in FIG. 2, such as the routing data 34(rout), the cartographic data 34(carto), the maneuver data 34(man) and the POI and other data 34(poi).

The geographic data 110 are comprised of a plurality of data entities or records. These data entities are grouped into a plurality of parcels 115 such that each parcel contains a portion of the plurality of data entities which comprise the geographic data 110. In one embodiment, each parcel conforms to a regular data size, e.g. sixteen kilobytes, eight kilobytes, etc. This organization into parcels facilitates storage and retrieval of geographic data. In one embodiment, all the data which correspond to the different types of geographic data represented in FIG. 2, such as the routing data 34(rout), the cartographic data 34(carto), the maneuver data 34(man) and the POI and other data 34(poi), are organized into parcels 115. As shown in FIG. 3, parcels (1) through (L) contain routing data 34(rout), parcels (L+1) through (L+M) contain cartographic data 34(carto), parcels (L+M+1) through (L+M+N) contain maneuver data 34(man), and parcels (L+M+N+1) through (L+M+N+P) contain other data 34(poi) including point of interest data.

The cartographic data subset 34(carto), included in the parcels (L+1) through (L+M) contain the geographic feature information that is used for reproducing portions of the geographic region represented by the geographic database 34 on a display associated with the navigation system. These cartographic data may be provided in a plurality of layers with each layer including data corresponding to the entire geographic region but at a different level of detail. A lowest layer, layer 0, includes a complete collection of all the cartographic data pertaining to the geographic region and therefore provides the greatest level of detail. Each higher layer, e.g. layers 1, 2, 3 . . . , includes less detail than the layer immediately below it by omitting features having a rank lower than the corresponding layer. For example, layer 1 cartographic data omits geographic features having a rank of 0, layer 2 cartographic data omits geographic features having a rank of 0 or 1, and so on. (The rank of a geographic feature corresponds to an attribute assigned to the feature when it is entered into the database. For example, an alley may have a rank of "0" whereas an expressway may have a rank of "4.") Since layer 0 includes the most data, it requires the most parcels. It follows therefore that each higher layer of cartographic data requires fewer parcels than the layer immediately below it.

In a present embodiment, the cartographic data are spatially organized into the parcels. Within a layer, each parcel of cartographic data includes data which represent geographic features encompassed within a geographic area in the region which is separate from the geographic areas which encompass the features included in all the other parcels at that layer. In other words, at a given layer of cartographic data, the physical features represented by the geographic data in any one parcel are all next to each other and encompassed by a geometric boundary that excludes the physical features represented by data included in all of the other parcels. In a present embodiment, the geometric boundary is rectangular.

Methods for parcelizing data are disclosed in copending applications Ser. Nos. 08/740,295 and 08/924,328 (Atty Docket No. 7117-61 filed Sep. 5, 1997), the disclosures of which are incorporated by reference herein.

B. Representation of Overlays in First Embodiment

Figure 4:
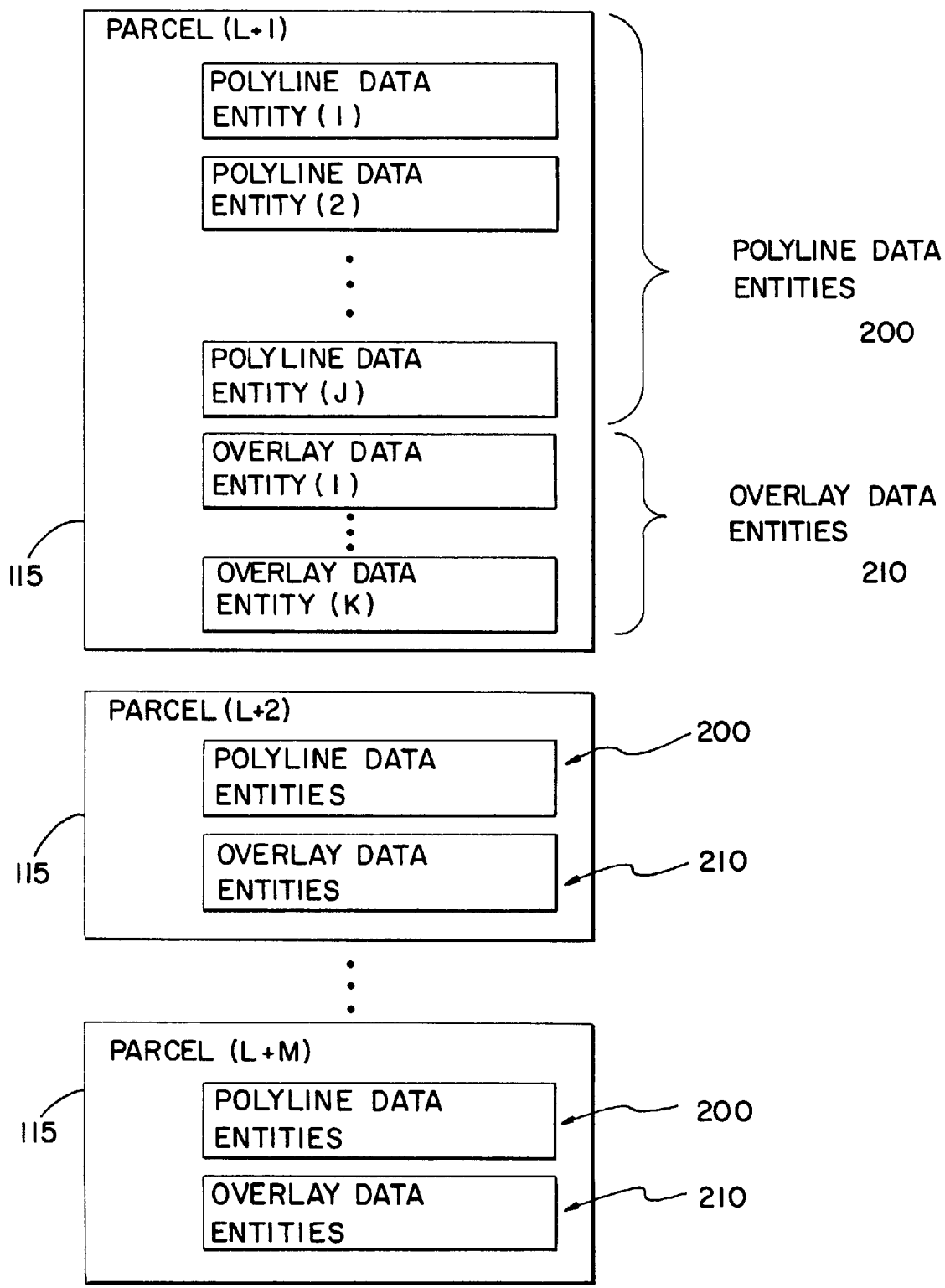
FIG. 4 illustrates the types of data entities included in the parcels of cartographic data shown in FIG. 3.

FIG. 4 shows the parcels of cartographic data 34(carto) from FIG. 3. As mentioned above, the cartographic data 34(carto) includes data which are used to render an image of a portion of the geographic region on a display device associated with the navigation system. In this embodiment, among the kinds of data included among the cartographic data 34(carto) are polyline data entities 200. Polyline data entities may be included in each of the parcels (L+1) through (L+M) of the cartographic data 34(carto).

Figure 5:
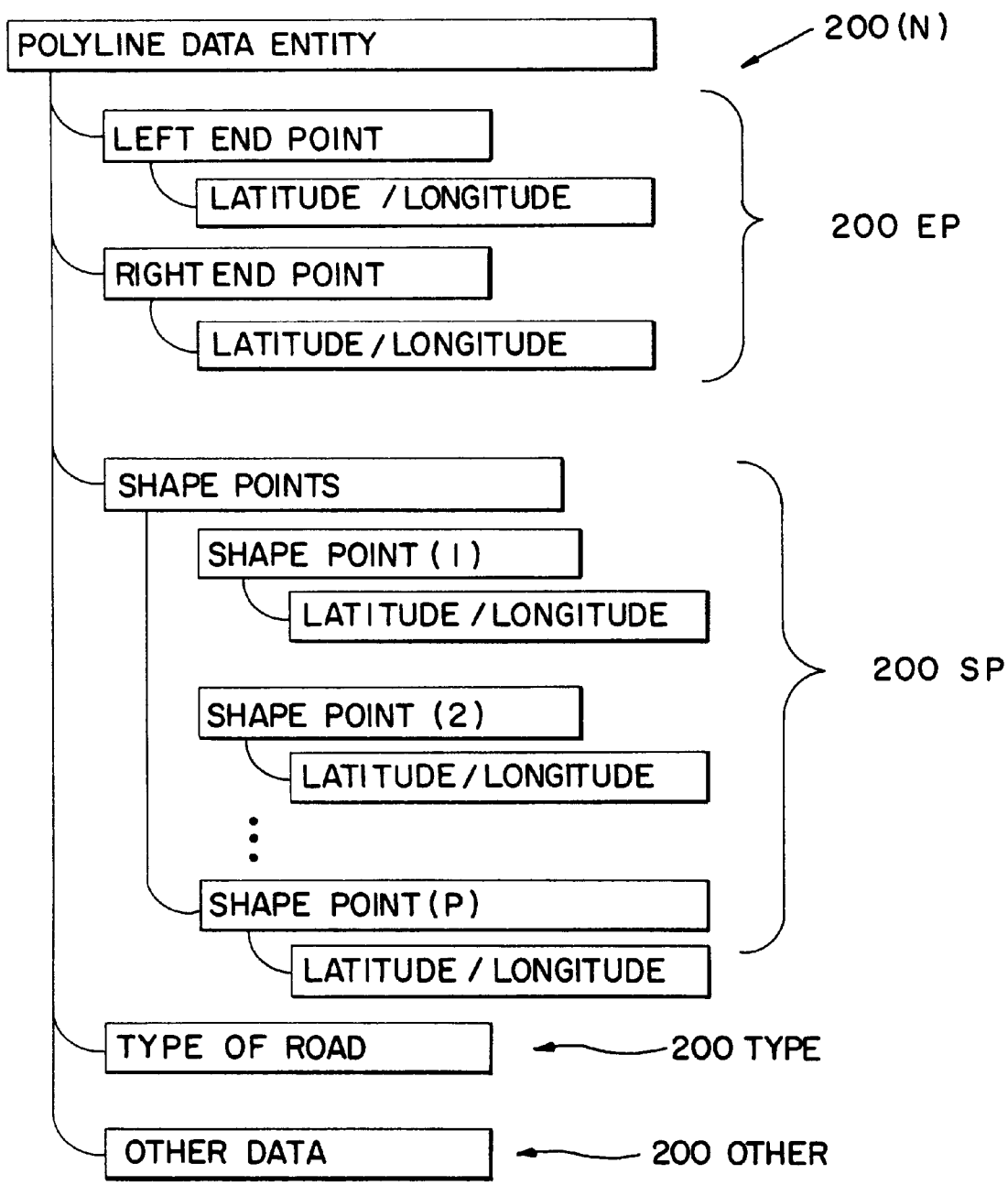
FIG. 5 is a diagram illustrating the data structure of the polyline data entities shown in FIG. 4.

Referring to FIG. 5, there is a diagram showing the structure of one of the polyline data entities 200 shown in FIG. 4. A polyline data entity represents a continuous linear geographic feature located within a geographic area which corresponds to a parcel of the cartographic data 34(carto). Each of the polyline data entities may represent a continuous linear geographic feature such as a portion of a road, a railroad track, a ferry route, a river, and so on. The geographic feature represented by the polyline data entity may be straight or other-than-straight. Each of the polyline data entities contains (1) data 200EP which identify the two end points of the continuous linear geographic feature, (2) data 200SP which identify one or more shape points located along the continuous linear geographic feature between the two end points, (3) data 200TYPE which identify the type of road or other feature the polyline entity represents, and (4) optionally, other data 200OTHER.

The end points data 200EP include data which identify the geographic coordinates (latitude and longitude) of the right end point and the geographic coordinates (latitude and longitude) of the left end point of the geographic feature represented by the polyline data entity. If the continuous geographic feature represented by the polyline data entity is other-than-straight, the polyline line data entity may include data 200SP which define the shape of the continuous linear feature by identifying the geographic coordinates (latitude and longitude) of one or more physical locations through which the continuous linear geographic feature passes. (Although the term "shape point" is used, other terminology may be used to indicate the same or similar concepts, such a "locus" or "position", to identify these features.) The polyline data entity also includes data 200TYPE indicating the kind of geographic feature the polyline data entity represents. For example, the data 200TYPE may include data indicating that the polyline data entity represents a limited access expressway, a tollway, a bridge, a ferry, an alley, a side street, a railroad track, a river, and so on. Each of these different types of features may be portrayed differently by the navigation application program, for example in different colors. The polyline data entity may include other data 200OTHER as well.

Referring again to FIG. 4, in a present embodiment in addition to the polyline data entities 200, the cartographic data 34(carto) also includes overlay data entities 210. (In addition to the polyline data entities and the overlay data entities, there may be other kinds of data included in the cartographic data 34(carto) as well.) As discussed earlier, the linear geographic features represented by the polyline data entities 200 may physically cross over or under each other at different elevations without intersecting such as where one highway crosses over another highway, where a highway crosses over a river, where a road crosses under a railroad trestle, and so on. To provide for representing these crossings, an overlay data entity 210 is associated with the location at which one or more geographic features cross over or under each other at different elevations. Overlay data entities 210 may be included in each of the parcels (L+1) through (L+M) of the cartographic data 34(carto).

Figure 6:
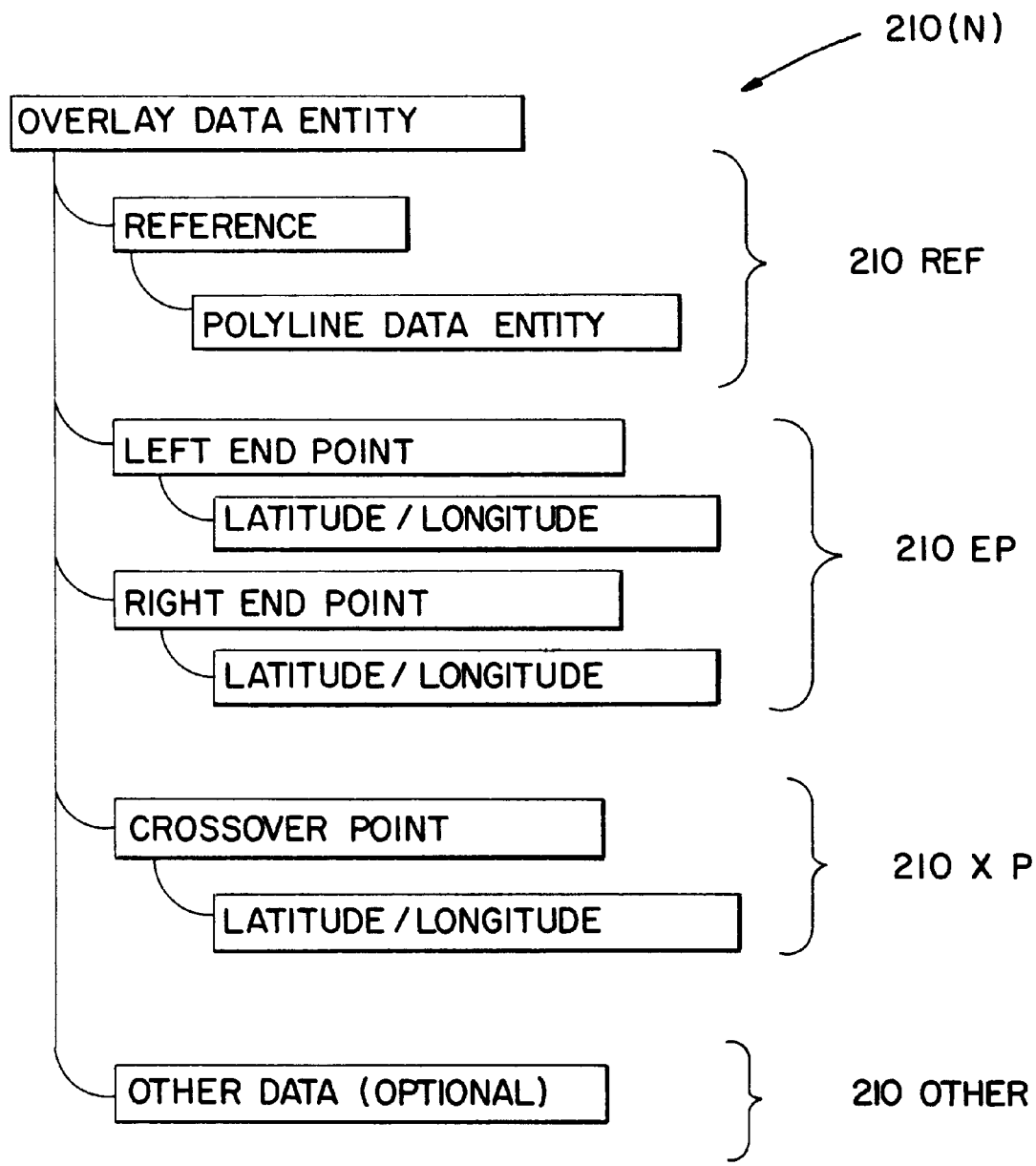
FIG. 6 is a diagram illustrating the data structure of the overlay data entities shown in FIG. 4.

Referring to FIG. 6, there is a diagram illustrating the structure of an overlay data entity 210(n). The overlay data entity 210(n) contains (1) data 210REF which identifies or refers to the polyline data entity that represents the continuous geographic feature with the highest elevation of two or more continuous geographic features which cross each other at different elevations at the same physical geographic coordinates, (2) data 210EP which identifies the end points of the extent of the overlay data entity, (3) data 210XP which identifies a crossover point located along the extent of the overlay data entity between its two end points, and (4) optionally, other data 210OTHER.

The overlay reference data 210REF which identifies the polyline data entity having the highest elevation may be any suitable reference to the polyline data entity. The reference to the polyline data entity may be a reference or a pointer to a database ID, or may be a reference to an address or offset at which the polyline data entity may be found.

The overlay data reference 210REF to the polyline data entity which represents the geographic feature with the highest elevation preferably takes into account the organization of the cartographic data into layers. As explained above, in a preferred embodiment, the cartographic data 34(carto) are organized into layers so that different collections of the cartographic data include more or less detail. Geographic features of lower rank are omitted from higher layers of the cartographic data 34(carto). This organization affects whether an overlay data entity exists at a given layer and may affect which polyline data entity is referenced by an overlay data entity at a given layer. For example, at layer 0 of the cartographic data 34(carto), an overlay data entity is included to represent a location at which a secondary street having a rank of "1" crosses over an expressway having a rank of "4." However, at layer 2 of the cartographic data 34(carto) all features having a rank less than "2" are omitted, and therefore the cartographic data(34) will not include a polyline data entity corresponding the secondary street having a rank of "1." Therefore, layer 2 of the cartographic data 34(carto) does not include an overlay data entity representing this crossing location. Similarly, if a secondary street having a rank of "1", a main business road having a rank of "3", and an expressway having a rank of "4" all cross at the same location with the secondary street having the highest elevation, the business street next, and the expressway at the lowest elevation, an overlay data entity referring to the secondary street is included at layers 0 and 1. However, at layers 2 and 3 of the cartographic data 34(carto) an overlay data entity corresponding to this crossing location will refer to the main business street having a rank of "3." Layer 4 and above will include no overlay data entity corresponding to this location because both the secondary street and the main business road are not included in these layers. (In an alternative embodiment, exceptions may be made to the omission of overlay data entities at higher layers so that lower ranked geographic features which cross higher ranked geographic features are represented at layers in which they would not otherwise appear in order to provide additional visual cues to an end-user of the navigation application program.)

Referring still to FIG. 6, the overlay data entity 210(n) includes data 210EP which represent the right and left end points of the extent of the overlay data entity. Each of the end point data 210EP includes geographic coordinates (latitude and longitude). These two geographic coordinates correspond to positions located along the geographic feature represented by the polyline data entity referenced in 210REF by the overlay data entity. These end point coordinates may be automatically generated during the process of preparing the geographic database after the topmost geographic feature at a given layer is determined.

In one alternative embodiment, these end points 210EP may be chosen arbitrarily along the topmost referenced geographic feature. The locations of these end points may be selected to enhance the presentation of meaningful information to the end-user. For example, in layer 0 of the cartographic data, the coordinates of the end points 210EP may be selected to be at 50 meters on either side of the coordinates of the exact location of the crossing, but at layer 2 of the cartographic data, the coordinates of the end points 210EP may be selected to be at 200 meters on either side of the coordinates of the exact location of the crossing. This is useful so that the overlay data entity is rendered large enough (i.e., long enough) to be visually perceivable by the end user when it is displayed on the display device at different zoom levels correlated to the layers of cartographic data. In an alternative embodiment, the end point data may correspond to actual locations at which the topmost geographic feature begins to cross over the other feature(s). In another alternative embodiment, the end points 210EP of the overlay data entity 210 may be selected to correspond to the shape points of the topmost polyline 200 that are closest on either side of the point at which the topmost feature crosses the other feature(s). In a still further embodiment, a combination of the above approaches may be used.

As mentioned above, the overlay data entity 210(n) includes crossover point data 210XP. The crossover point data 210XP include geographic coordinates (latitude and longitude) for a single point. The crossover data 210XP represents the point along the extent of the overlay data entity between its end points 210EP at which the linearly extending feature represented by the topmost polyline crosses over the one or more other linearly extending features represented by other polylines. The coordinates of the crossover point 210XP may be derived from the collections of geographic data that provide these coordinates in association with z-levels or with altitudes at the location of the crossover. Thus, the coordinates of the crossover point may be automatically generated during the process of preparing the geographic database after the topmost geographic feature at a given layer is determined. The coordinates of the crossover point 210XP may be used to center the image of the overlay for display purposes.

As further mentioned above, the overlay data entity 210(n) optionally includes other data 210OTHER. These other data 210OTHER may include a reference to an icon or other graphical image intended to represent an overpass, underpass, or the like, to be displayed at the location on the display device where the represented geographic features cross each other. In an alternative embodiment, the overlay data entity 210(n) may also include shape point data that defines one or more coordinate positions located along the extent of the overlay data entity between its two end points.

As described above, the overlay data entity 210(n) usually includes the coordinates of three points, the two end points and the crossover point. However, if the point at which the topmost linearly extending feature crosses over the one or more other linearly extending features coincides with an endpoint of the topmost polyline, the overlay data entity used to represent the crossing may include only two points, one point corresponding to the crossover point 210XP and only one end point 210EP. Under these circumstances, the crossover point 210XP of the overlay data entity 210 would correspond to the one end point 200EP of the topmost polyline 200 and the one end point 210EP of the overlay data entity 210 would correspond to a point along the topmost polyline adjacent to the end point 200EP, such as the shape point 200SP of the polyline closest to the end point 200EP. When the crossover point 210XP of an overlay entity 210 corresponds to an endpoint 200EP of the topmost polyline, there may be a second polyline data entity that has an end point corresponding to the crossover point but which extends away from the first polyline. Another overlay data entity may be used to represent this portion of the crossing corresponding to the second polyline.

Referring to FIG. 4, as grouped within each parcel 115 of cartographic data 34(carto), the polyline data entities 200 and the overlay data entities 210 are physically ordered so as to create an inferred load ordering to the navigation system. With this inferred load ordering, the navigation application program will render the geographic features represented by the polyline data entities 200 first and then render the higher elevation crossings represented by the overlay data entities 210 over the already rendered geographic features. This is done by loading and rendering the polyline data entities 200 and overlay data entities 210 in the order in which they are physically stored. By loading and rendering the polylines entities and the overlays entities in their stored order, the navigation system can avoid the performance impact of having to calculate which of the features to represent as being topmost.

C. Method for producing polyline overlays in a geographic database

Figure 7:
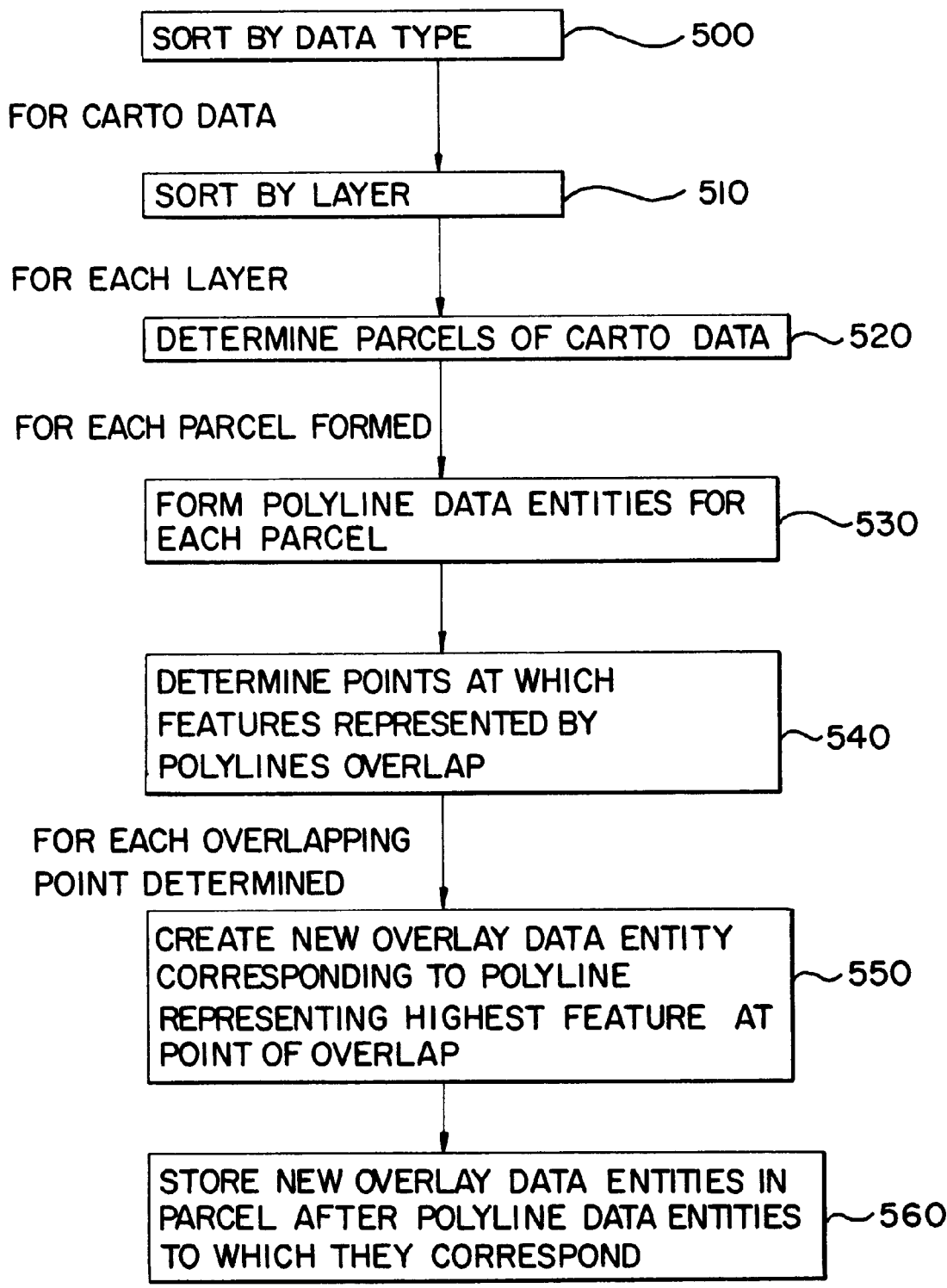
FIG. 7 is a flow chart showing a process for forming the embodiment show in FIGS. 4 through 6.

Referring to FIG. 7, there is shown generally a method for producing a geographic database that includes overlay data entities. The first step (Step 500) is to separate the information representing the geographic region into the various data sets of the geographic database, including the routing data set 34(rout), the cartographic data set 34(carto), the maneuver data set 34(man) and the POI and other data set 34(poi). Alternatively, the geographic database may include additional data sets to support other features of the navigation application program. In a further alternative embodiment, all of the information representing the geographic region may be provided in a single data set, only a respective portion of which would need to be used in conjunction with providing a particular function such as route calculation, cartographic display, maneuver generation, and so on.

Once the data to be stored in the cartographic data set is sorted from the other geographic information, the data is further sorted into layers (Step 510). As mentioned above, layers are subsets of the cartographic data set which contain different amounts of information representing different layers of geographic feature detail within the represented geographic region. Layers are used to provide alternate representations of the same geographic region with varying levels of geographic feature detail. At the lowest layer is layer 0 which contains the most detail and contains all possible geographic feature information within the geographic region. At the next higher layer, the amount of geographic feature information is reduced by dropping out the most restrictive classification of geographic features. At subsequent higher layers, additional classifications of geographic features are dropped out of the subset to further reduce the represented detail.

For each layer of the cartographic data 34(carto), the data are divided into a separate collection of parcels (Step 520). Methods for subdividing and ordering a geographic region into portions which can be stored in a parcel are known in the art. Methods for parcelization are disclosed in the Ser. Nos. 08/740,295 and 08/924,328, the disclosures of which are incorporated herein by reference.

For each parcel, polyline data entities are determined from the data entities which represent linear geographic features located within the geographic region corresponding to the parcel. (Step 530). Once all the polyline data entities to be included in a parcel are determined, all the locations at which each of the linear geographic features represented by polyline data entities in the parcel cross other linear geographic features represented by other polyline data entities in the parcel at different elevations are determined. (Step 540). For each such location, the linear geographic feature with the highest elevation is determined. This determination can be made by comparing altitude data corresponding to each of the respective linear geographic features or by comparing z-level data corresponding to each of the linear geographic features. An overlay data entity is created corresponding to the location and stored in the parcel (Step 550). A reference (or pointer) to the polyline data entity representing the topmost geographic feature is included in the overlay data entity. The overlay data entity also includes data corresponding to the end points. These end points are geographic coordinates located along the topmost geographic feature and define the extent that the overlay data entity is determined to extend. These end point coordinates may be generated during the production of the geographic database and do not necessarily correspond to any physical features, such as the beginning of a bridge or overpass. Alternatively, the end points may correspond to such actual physical features. In another alternative embodiment, the selection of the locations of the end points may take into account situations where one geographic feature crosses over several other geographic features in close proximity. For example, where one geographic feature passes over two other geographic features that are close to each other but which do not overlap each other at the location at which the first geographic features passes over them, the end points associated with the overlay data entity that points to the first geographic feature may be selected to show a continuous crossing over both underlying geographic features.

After all the overlay data entities are determined, the polyline data entities and overlay data entities are stored in the parcel (Step 560). (Other cartographic data may also be included in the parcel.) In a preferred embodiment, the overlay data entities 210 are physically stored in the same parcel as the polyline data entities to which they correspond. Further, in a preferred embodiment, the overlay data entities are physically stored after all the polyline data entities in the parcel. In alternative embodiments, the overlay data entities may be stored before the polyline data entities or even in other parcels. However, it is preferred that the overlay data entities are stored in a consistent order so that the navigation application can use the ordering to render the overlay data entities after the polyline data entities are rendered.

D. Method for using the geographic database with polyline overlays

Figure 8:
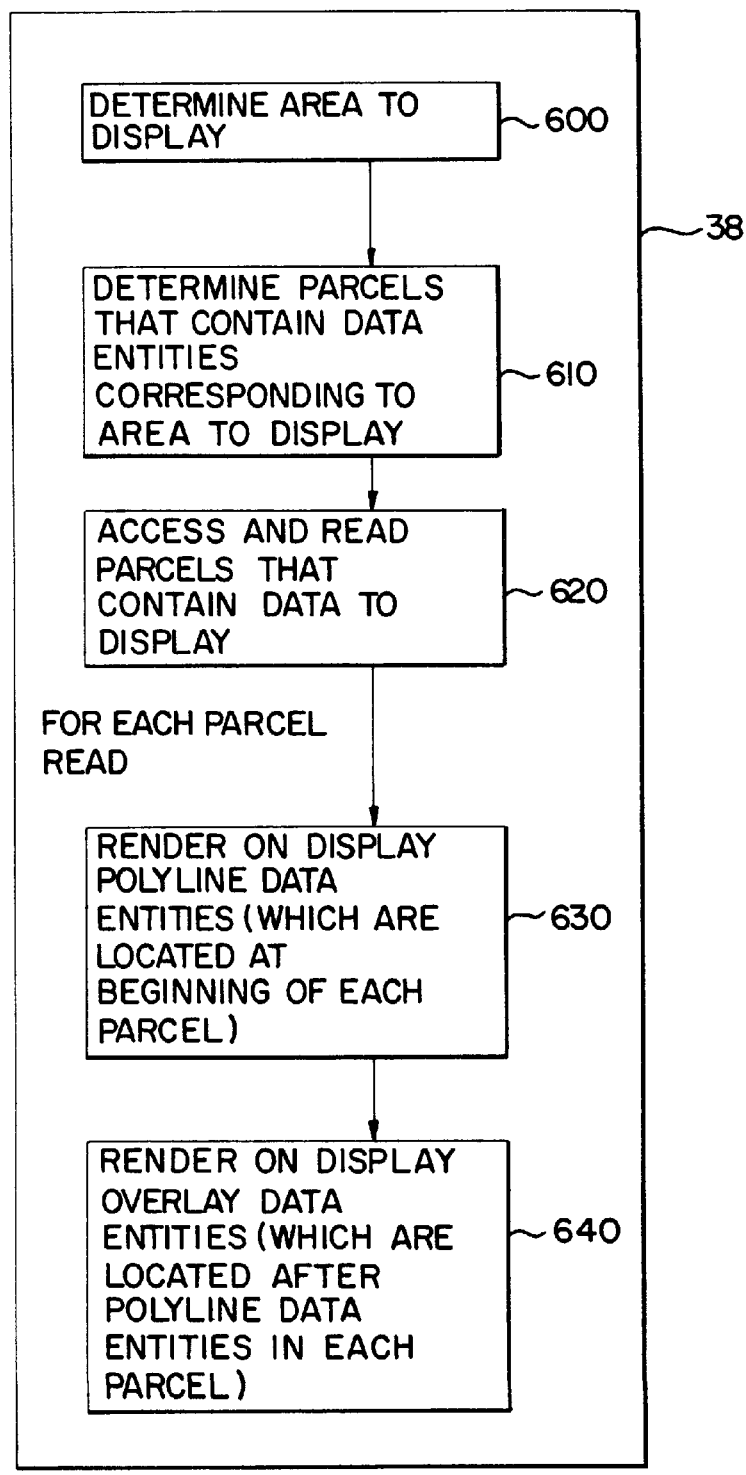
FIG. 8 is a flow chart showing a process by which the navigation application program of FIG. 1 uses the embodiment shown in FIGS. 5 and 6.

Referring to FIG. 8, there is a flow diagram illustrating the steps performed by a navigation application program 38 for rendering images of a portion of a geographic region on an associated display device using a geographic data set that includes cartographic data that uses polyline overlays to display areas where two or more geographic features cross each other at different elevations. The first step (Step 600) is to determine the portion of the geographic region to be displayed. Then, the parcel(s) containing the data corresponding to the area to be displayed are determined and located on the medium 32. (Step 610).

Next, each of the parcels that has been determined to contain data necessary to render the desired image is accessed and read. (Step 620). As each parcel is accessed and read, the polyline and overlay data entities included in the parcel are accessed and read. In one embodiment, within each parcel the polyline and overlay entities are encountered in the order in which they are stored within the parcel.

Because the polyline data entities are physically stored before the overlay data entities within the parcel, all of the polyline data entities can be used before the overlay data entities. For each polyline data entity contained within the parcel, the navigation application program 38 renders the geographic feature represented by the polyline entity on the associated display 40 using the end point data, shape point data, type data, and any other data, if present, contained within the polyline data entity (Step 630). This rendering process may involve first writing data to an image buffer or may involve writing the data to the screen. This process is repeated for all of the polyline data entities to be rendered from the parcel.

Following the inferred ordering given by the structural organization of the data entities within the parcel, the navigation application program next renders the crossings represented by the overlay data entities (Step 640). For each overlay data entity contained within the parcel, the navigation application program may use the polyline reference 210REF contained within the overlay data entity to generate an appropriate crossing image at the location where the geographic feature represented by the referenced polyline data entity crosses over other features. Because the overlay data entity references the polyline data entity with the highest elevation, the image rendered of the crossing represented by the overlay data entity may assume any attributes of the topmost referenced polyline data entity. For example, the navigation application may render the crossing image in the same color it uses for the geographic feature represented by the referenced polyline data entity. The navigation application may use the end points data 210EP in the overlay data entity to render the crossing image with the proper orientation and with the proper extent. The navigation application may use the shape point data 210SP in the overlay data entity to render the crossing image with the proper shape. The navigation application may use the other data 210OTHER included in the overlay data entity to select an appropriate icon to represent an overpass, underpass, tunnel, etc., to be rendered.

Using the data in the overlay data entity to display the crossing has the effect of re-drawing over the images of the features represented by the polyline data entities. This effectively portrays the crossing as corresponding to the topmost feature without requiring the navigation application to calculate which feature is topmost. This step is repeated for each overlay data entity contained within the parcel.

Figure 9A:
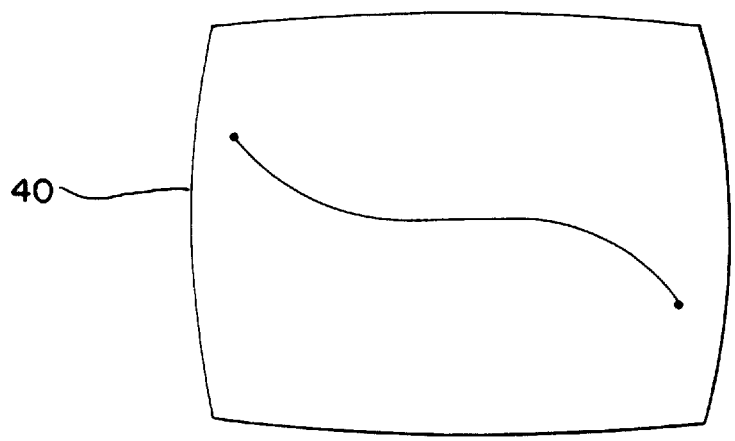
FIGS. 9A–9C are illustrations of computer displays showing the process of FIG. 8.
Figure 9B:
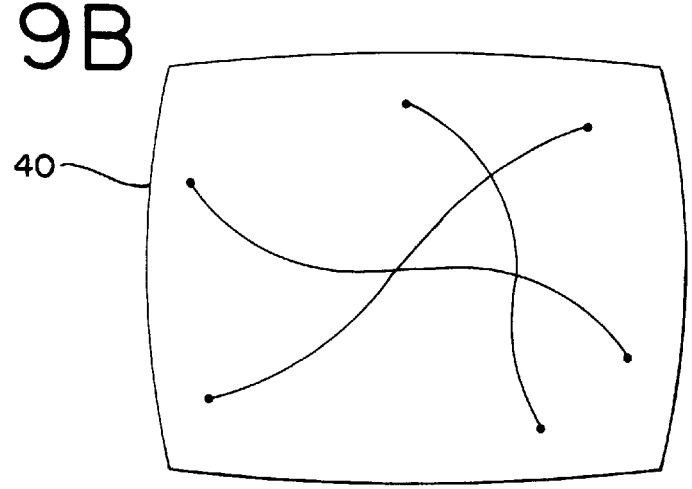
Figure 9C:
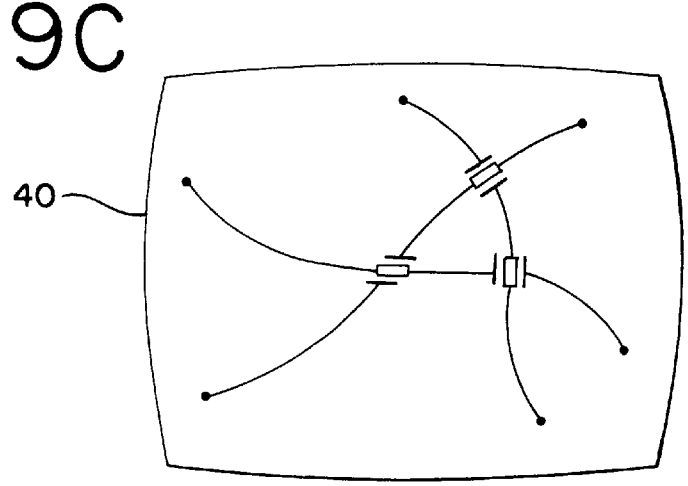

Referring to FIG. 9, there is an example of how the method of FIG. 8 operates. FIG. 9A shows first execution of the Step 630 from FIG. 8 which renders the linearly extending geographic feature represented by the first polyline data entity on the display 40 associated with the navigation system. FIG. 9B shows the same display after the geographic features represented by the remaining polyline data entities in the parcel have been rendered. At this stage, the display 40 represents no depth of the geographic feature information and it is not possible to determine which geographic feature crosses another at the same or different elevation. The navigation application program then executes Step 640 of the method of FIG. 8 and renders the crossing represented by the overlay data entities. FIG. 9C shows the result where the crossings represented by the polyline overlay data entities have been rendered over the locations where the geographic features cross, clarifying what appeared to be intersections at the same elevation and representing the elevation relationship between the geographic features. It is noted that each of the crossings shown in FIG. 9C may be rendered in the color of the geographic feature which is topmost so that it appears to the end user that the crossing is formed of a continuous part of the geographic feature which is topmost. This has the advantage of providing the end user with meaningful information about crossings and overpasses.

It is noted that if the end user zooms out or in, a different layer of the cartographic data may be used. These other layers of the cartographic data are contained in different parcels so that as these new parcels are read, different overlay data entities are accessed and rendered over the rendered linearly extending features. This has the effect of automatically accounting for which features to display as crossing over other features at different levels. The need for the navigation application program to recalculate the topmost feature is avoided, thereby speeding up rendering of the display.

It is intended that the foregoing detailed description be regarded as illustrative rather than limiting and that it is understood that the following claims including all equivalents are intended to define the scope of the invention.

We claim:

1. A method of displaying a crossing of at least two linearly extending geographic features that cross at different elevations on a computer display device of a computer based navigation system that uses a geographic database stored on a computer readable medium wherein said geographic database comprises:

a plurality of parcels, each containing a plurality of polyline data entities each of which represents a linearly extending geographic feature located within a geographic area;

and further contained in each of said plurality of parcels that contains polyline data entities that represent linearly extending geographic features that cross each other at different elevations is a separate overlay data entity that represents each overpass portion of each linearly extending geographic feature that crosses over another linearly extending geographic feature at a higher elevation;

the method comprising the steps of:

determining a selected portion of the geographic area to display on said computer display device;

locating which of the plurality of parcels contains the polyline data entities corresponding to said selected portion of the geographic area;

rendering the linearly extending geographic features represented by said polyline data entities contained in said parcel corresponding to said selected portion of the geographic area on said computer display device;

rendering the portion of each geographic feature represented by each overlay data entity contained in said parcel corresponding to said selected portion of the geographic area over said rendered geographic features represented by said polyline data entities on said computer display device, whereby the displaying of the overlay data entity over the polyline data entities depicts which of said linearly extending geographic features has the higher elevation where linearly extending geographic features cross each other at different elevations.

2. The method of claim 1 wherein said overlay data entity is represented using data attributes of the corresponding portion of said polyline data entity representing said one of said at least two crossing physical geographic features which crosses at the highest elevation.

3. A method of reproducing a crossing of at least two physical geographic features that cross at different elevations on a computer display device comprising the steps of:

reading a plurality of data entities of a first type representing at least two individual geographic features that cross each other at different elevations from a computer readable medium in the order in which they are physically located on said computer readable medium;

rendering images of said at least two individual geographic features which cross each other at different elevations on said computer display device using said plurality of data entities of said first type;

reading from said computer readable medium a data entity of a second type that represents an overpass portion of the geographic feature of a higher elevation of said at least two individual geographic features that cross each other at different elevations, said data entity of said second type physically located after said plurality of data entities of said first type on said computer readable medium; and rendering said overpass portion represented by said data entity of said second type on said computer display device, whereby displaying the data entity of the second type over the data entities of the first type depicts the overpass portion of the one of said geographic features that has the higher elevation.

4. A method for displaying images of portions of a geographic region on a computer display, wherein the images portray at least two linearly extending geographic features one of which crosses another at a higher altitude, said method comprising the steps of:

reading from a computer-readable database stored on a computer-readable medium a first selected subset of a first plurality of data entities, wherein each of said first plurality of data entities represents a respective one of a plurality of linearly extending geographic features;

rendering on said computer display images of the linearly extending geographic features represented by said first selected subset of said first plurality of data entities;

reading from said computer-readable medium a second selected subset of a second plurality of data entities, wherein said second plurality of data entities represents linearly extending portions of said plurality of linearly extending geographic features that cross over other linearly extending geographic features at a higher altitude; and rendering on said computer display images of said portions of geographic features represented by said second selected subset of said second plurality of data entities, whereby the rendering of the second selected subset of said second plurality of data entities over the first selected subset of said first plurality of data entities depicts which of said rendered linearly extending geographic features has the higher altitude where linearly extending geographic features cross each other at different altitudes.

5. A method of storing representations of overpasses, wherein each overpass is a portion of one linearly extending geographic feature that passes over another linearly extending geographic feature at a higher altitude, said method comprising the steps of:

storing in a computer-readable database, a first plurality of data entities, each of which represents a respective one of a plurality of linearly extending geographic features; and storing in said computer-readable database, a second plurality of data entities wherein each of said second plurality of data entities represents a separate linearly extending portion of a linearly extending feature represented by one of said first plurality of data entities, and wherein the linearly extending portion of a linearly extending feature represented by each of the second plurality of data entities crosses over at a higher altitude another linearly extending feature represented by another of said first plurality of data entities.

6. A method of producing a geographic database comprising the steps of:

identifying locations at which linearly extending features in a geographic region cross other linearly extending features at different elevations;

storing data entities of a first type in said geographic database to represent said linearly extending geographic features; and storing data entities of a second type in said geographic database to represent linearly extending portions of the linearly extending geographic features that cross over other linearly extending features at said identified locations whereby displaying the linearly extending portions represented by the data entities of the second type over the linearly extending geographic features represented by the data entities of the first type depicts which of said linearly extending geographic features have higher altitudes at said locations at which one linearly extending geographic feature crosses another at a higher elevation.

7. The method of claim 6 wherein each of said data entities of said second type is stored in said geographic database in a known order relative to the data entities of said first type the crossings of which are represented thereby.

8. The method of claim 6 further comprising the step of:

dividing a collection of data from which said data entities of said first type are formed into a plurality of parcels; and storing each of the data entities of said second type in the same parcel as the data entities of said first type which represent the linearly extending geographic features the crossings of which are represented by the data entities of said second type.

9. A computer-readable medium having computer-readable data embodied thereon for representing geographic features in a geographic region and displaying said geographic features on a display device, comprising:

data entities of a first type and data entities of a second type, wherein said data entities of said first type and said data entities of said second type are embodied on said medium, wherein each of said data entities of said first type represents a respective linearly extending geographic feature located in said geographic region, wherein each of said data entities of said second type represents a linearly extending portion of a respective corresponding linearly extending geographic feature represented by a data entity of said first type, and wherein the linearly extending portion represented by a data entity of said second type represents a portion of the corresponding linearly extending geographic feature that crosses over at a higher altitude at least one other linearly extending geographic feature represented by another data entity of said first type, whereby the displaying of the data entities of the second type over the data entities of the first type depicts which of said linearly extending geographic features has the higher altitude where linearly extending geographic features cross each other.

10. The invention of claim 9 wherein each one of said data entities of said second type includes a reference to the data entity of said first type that represents the linearly extending feature of which the portion represented by the data entity of said second type is a part.

11. The invention of claim 9 wherein each data entity of said second type includes data that represents two locations along the geographic feature represented by the corresponding data entity of said first type.

12. The invention of claim 11 wherein said two locations represent an extent of the crossing represented by the data entity of said second type.

13. The invention of claim 9 wherein each data entity of said second type includes data that references the one data entity of said first type that represents the geographic feature having a highest altitude of any of the geographic features represented by any of the data entities of said first type at a location of the crossing represented by the respective one of the data entity of said second type.

14. The invention of claim 9 wherein each data entity of said second type includes data that references an icon representing a crossing type.

15. The invention of claim 9 wherein each data entity of said second type is consistently ordered on said medium relative to all the data entities of the first type that represent linearly extending geographic features that cross each other at the crossing represented by said one of the of data entities of the second type.

16. The invention of claim 9 wherein each of the data entities of said second type is stored on said medium after the data entities of the first type that represent linearly extending geographic features that cross each other at the crossing represented by said one of the data entities of the second type.

17. The invention of claim 9 wherein said data entities of said first type and said data entities of said second type are organized on said medium in a plurality of parcels, such that each parcel includes a separate subset of data entities of said first type and said data entities of said second type.

18. The invention of claim 17 wherein each one of said data entities of said second type is stored in the same parcel as the data entities of the first type that represent geographic features that cross each other at the crossing represented by the one of said data entities of said second type.

19. The invention of claim 18 wherein each one of said data entities of said second type is stored within the same parcel after the data entities of the first type that represent geographic features that cross each other at the crossing represented by the one of said data entities of said second type.

20. The invention of claim 9 wherein said data entities of said first type and said data entities of said second type are organized on said medium in a plurality of layers, such that each layer includes a separate level of detail of geographic features in said geographic region.

21. The invention of claim 20 wherein higher layers of said plurality of layers provide less detail by omitting features having a lower ranking than a ranking assigned to features in said higher layers.

22. The invention of claim 20 wherein said data entities of said first type and said data entities of said second type of each of said plurality of layers are organized on said medium in a plurality of parcels, such that each parcel includes a separate subset of said data entities of said first type and said data entities of said second type.

* * * * *